(12) United States Patent
Omata et al.

(10) Patent No.: US 6,504,327 B2
(45) Date of Patent: Jan. 7, 2003

(54) CONTROL APPARATUS FOR HYBRID VEHICLE

(75) Inventors: Yoshiaki Omata, Shizuoka-ken (JP); Kazuhiko Morimoto, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 60 days.

(21) Appl. No.: 09/825,194

(22) Filed: Apr. 3, 2001

(65) Prior Publication Data

US 2002/0043945 A1 Apr. 18, 2002

(30) Foreign Application Priority Data

Apr. 5, 2000 (JP) ........................... 2000-103015

(51) Int. Cl.⁷ ............................. H02P 7/622; B60K 6/04
(52) U.S. Cl. ...................... 318/139; 318/459; 318/500; 180/65.2
(58) Field of Search .................. 318/139, 459, 318/500; 180/65.1, 65.2, 65.3, 65.4; 322/14, 15, 16; 320/103, 104

(56) References Cited

U.S. PATENT DOCUMENTS

| | | | | |
|---|---|---|---|---|
| 5,942,879 A | * | 8/1999 | Ibaraki | 322/16 |
| 6,166,517 A | * | 12/2000 | Wakashiro et al. | 320/104 |
| 6,209,672 B1 | * | 4/2001 | Severinsky | 180/65.2 |
| 6,314,346 B1 | * | 11/2001 | Kitajima et al. | 701/22 |
| 6,336,063 B1 | * | 1/2002 | Lennevi | 701/22 |
| 6,366,059 B1 | * | 4/2002 | Wakashiro et al. | 322/16 |
| 6,397,601 B2 | * | 6/2002 | Morimoto et al. | 60/706 |

FOREIGN PATENT DOCUMENTS

| JP | 11-136808 | 5/1999 |
|---|---|---|
| JP | 11-332017 | 11/1999 |

OTHER PUBLICATIONS

Patent application Ser. No. 09/826 991, filed Apr. 5, 2001 *Control Apparatus for Hybrid Vehicle.*

* cited by examiner

*Primary Examiner*—Bentsu Ro
(74) *Attorney, Agent, or Firm*—Flynn, Thiel, Boutell & Tanis, P.C.

(57) ABSTRACT

A hybrid vehicle includes an engine and a motor disposed therein as a vehicle-propelling system, the motor being connected to an output shaft and having both driving and power-generating functions. The vehicle includes an engine control apparatus which controls a running state of the engine and a motor control apparatus which controls both driving and power-generating states of the motor to be independent from the control of the engine by the engine control apparatus. The motor control apparatus functions to detect an open-circuit voltage of a main battery at motor driving stop and to set an upper limit-determining voltage and a lower limit-determining voltage for motor driving according to the main battery open-circuit voltage. As a result, by the control apparatus, an over-charge and an over-electric discharge of the main battery can be prevented, and it is possible to extend battery life.

6 Claims, 5 Drawing Sheets

TABLE OF DRIVING TORQUE VALUE LIMIT COEFFICIENT

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| POWER-GENERATING TORQUE LIMIT COEFFICIENT | 0 | 0 | 0 | 0.1 | 0.2 | 0.4 | 0.6 | 0.8 | 1.0 | 1.0 | 1.0 | 1.0 | 1.0 | 1.0 | 1.0 |

TABLE OF POWER-GENERATING TORQUE VALUE LIMIT COEFFICIENT

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| POWER-GENERATING TORQUE LIMIT COEFFICIENT | 7.0 | 7.0 | 7.0 | 5.0 | 4.0 | 3.0 | 2.0 | 1.5 | 1.0 | 1.0 | 0.5 | 0 | 0 | 0 | 0 |

TABLE OF UPPER VOLTAGE LIMIT VALUES

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| UPPER VOLTAGE LIMIT VALUE | 230 | 230 | 230 | 230 | 230 | 220 | 215 | 210 | 210 | 210 | 210 | 205 | 205 | 205 | 205 |

TABLE OF LOWER VOLTAGE LIMIT VALUES

| MAIN BATTERY OPEN-CIRCUIT VOLTAGE | 190 | 191 | 192 | 193 | 194 | 195 | 196 | 197 | 198 | 199 | 200 | 201 | 202 | 203 | 204 |
|---|---|---|---|---|---|---|---|---|---|---|---|---|---|---|---|
| LOWER VOLTAGE LIMIT VALUE | 185 | 185 | 188 | 188 | 185 | 185 | 185 | 180 | 180 | 180 | 180 | 180 | 180 | 175 | 175 |

CONTROL APPARATUS FOR HYBRID VEHICLE

FIELD OF THE INVENTION

This invention relates to a control apparatus of a hybrid vehicle, and particularly to a control apparatus that sets both upper and lower limit-determining voltages according to a main battery open-circuit voltage, which can increase battery life by preventing an over-charge and an over-electric discharge of a main battery, and can improve reliability of the whole system because the life of the battery is increased.

BACKGROUND OF THE INVENTION

Some motor vehicles are of a type commonly called a hybrid vehicle having an internal combustion engine and an electric motor disposed therein as the power sources of a propulsion system. The hybrid vehicle further includes an engine control means for controlling a running state of the engine and motor control means for controlling an operating state of the motor. The engine control means and the motor control means detect respective operating states of the engine and the motor when the vehicle is traveling, and then exchange such detected data regarding the running states. As a result, the respective operating states of the engine and the motor are controlled in association with one another. Such a control system attains a high level of required performance (such as fuel efficiency, lower values of detrimental components in exhaust gases, and improves power performance).

One such example of a control apparatus of a hybrid vehicle is disclosed in published Japanese Application Laid-Open No. 11-332017. The control apparatus for a hybrid vehicle in this disclosure includes an engine which has a vehicle-propelling source, a power-generating electric motor providing both operations for generating an assisting output which assists engine output from a power supply energy of a battery apparatus having an accumulation of stored electricity and as a power-generating motor for generating energy to charge the battery apparatus. A power-generating motor control means executes an operation control of the power-generating motor. The power-generating motor control means controls the operation of the power-generating motor so as to keep electric power of the motor generated to the battery apparatus below a predetermined maximum limit value according to a quantity of accumulation of electricity in the battery apparatus. The motor control means prevents an excessive reduction of voltage between terminals in electric discharging and an excessive rise of voltage between terminals in charging of the battery apparatus which gives electricity to and receives electricity from the power-generating motor.

A control apparatus of a traditional hybrid vehicle has a lot of control elements (i.e. driving output, internal resistance, battery temperature, electric discharge depth) involved with the main battery voltage during motor driving, which are reflected in motor control. It is thought that the control values (limit values) change in discontinuity greatly, and there is an inconvenience or problem in that the control does not always converge (instability).

This invention solves the above-mentioned problem, and provides a control apparatus that can limit the usable range of a main battery by limiting motor driving depending on a state of the main battery. The control apparatus, in order to improve battery life and reliability, does not let a battery discharge electricity to less than a predetermined voltage (avoiding over-electric discharge), and executes main battery voltage charging below a predetermined voltage (preventing over-charge).

In order to obviate or minimize the above problem or inconvenience, the present invention provides a control apparatus for a hybrid vehicle having an engine and a motor disposed therein as a vehicle-propelling system, the motor being connected to an output shaft and having both driving and power-generating functions. The control apparatus includes an engine control means which controls a running state of the engine and a motor control means which controls both driving and power-generating states of the motor independent from the control of the engine by the engine control means. The motor control means has a function to detect an open-circuit voltage of a main battery when motor driving is stopped, to set an upper limit-determining voltage and a lower limit-determining voltage of the main battery for motor driving according to the main battery open-circuit voltage.

According to the present invention as previously described, at motor driving stop or off, a motor control means detects the open-circuit voltage of the main battery, and both upper and lower limit-determining voltage values for motor driving are set for the main battery according to the main battery open-circuit voltage. As a result, the system can prevent an over-charge and an over-electric discharge of the main battery, and it is possible to extend battery life.

DETAILED DESCRIPTION OF THE INVENTION

The present invention will now be described in specific detail with reference to FIGS. 1–9 which illustrate a embodiment of this invention.

Figure 2:
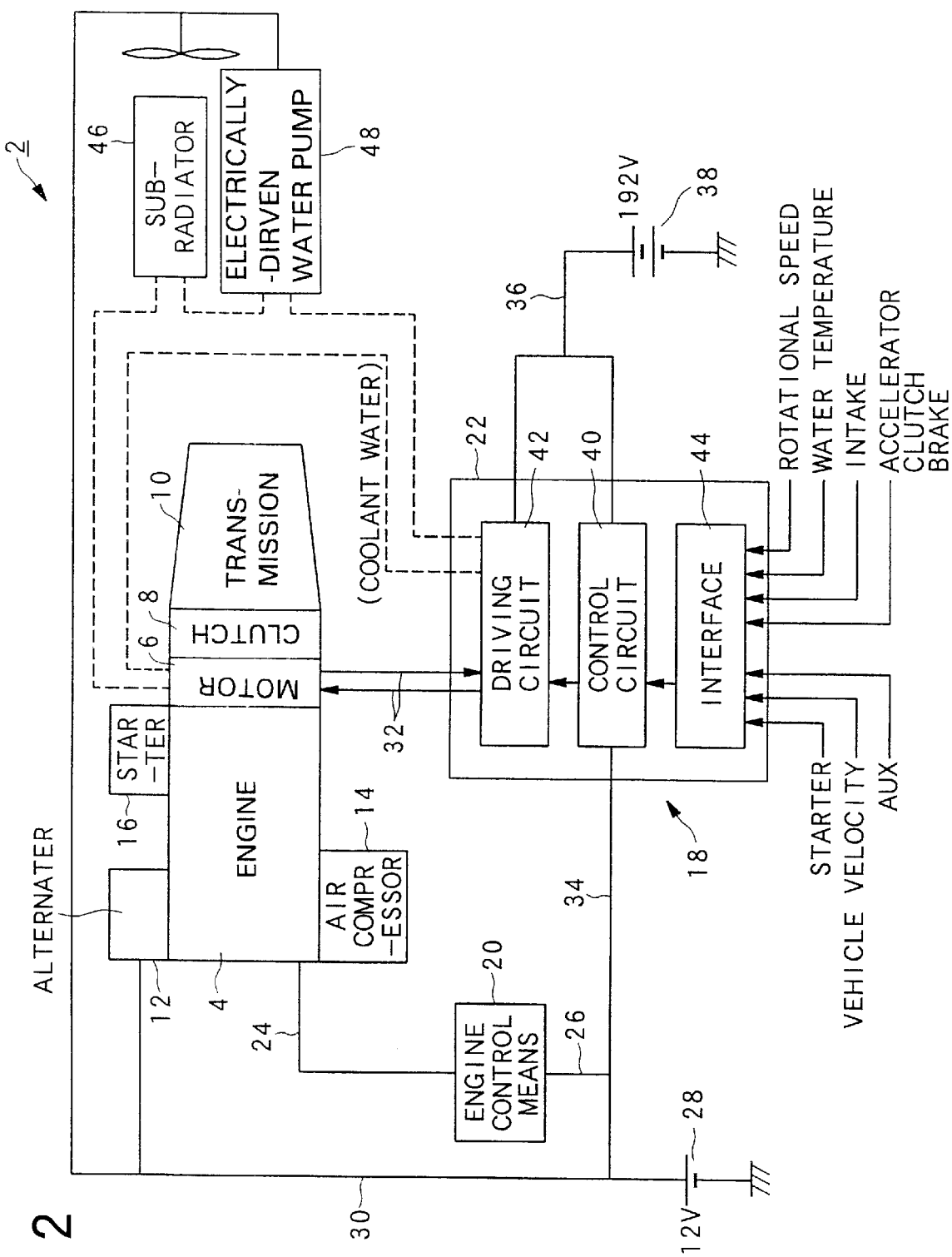
FIG. 2 is a block diagram illustrating a system of a controller for a hybrid vehicle.

In FIG. 2, reference numeral 2 denotes a vehicle-propelling system for a hybrid vehicle (not shown); 4 an engine; 6 a motor; 8 a clutch; and, 10 a manually operated transmission. In the hybrid vehicle, the engine 4 and the motor 6 having both driving and power-generating functions, are connected with an output shaft (not shown) of the engine 4, and are disposed therein as the vehicle-propelling system 2.

In the engine 4, for example, the motor 6 is directly connected to the engine 6, and the manual transmission 10 is directly connected to the motor 6 through the clutch 8. Further, the engine 4 is provided with an alternator 12, an air-conditioner (A/C) compressor 14 and a starter motor 16.

Incidentally, the motor 6 is positioned between the engine 4 and the manually operated transmission 10. In addition, the motor 6 includes a stator coil and a rotor such as a flywheel (not shown).

The vehicle-propulsion system 2 includes, as a control means 18, engine control means 20 and motor control means 22. The engine control means 20 controls a running state of the engine 4, while the motor control means 22 controls both driving and power-generating states of the motor 6.

The engine 4 is connected to the engine control means 20 through an engine-controlling signal line 24. "Line" is used herein to describe any electrical signal conduit. The engine control means 20 is linked to a sub-battery 28 through an engine control means-dedicated power line 26. The sub-battery 28 is coupled to the alternator 12 through a sub-battery-charging power line 30. The sub-battery 28 is a conventional 12-volt vehicle battery.

The motor 6 is connected to the motor control means 22 through a motor-controlling signal line 32. The motor control means 22 is linked to the sub-battery 28 through a motor control means-dedicated sub-power line 34 and the power line 30. The motor control means 22 is also coupled to a main battery 38 through a motor control means-dedicated main power line 36. The main battery 38 supplies driving electric power to the motor 6 and is charged by generated electric power from the motor 6.

The motor control means 22 is connected at the input side in order to take in the following signals: a starter signal, a vehicle velocity signal, an engine speed signal, a water temperature signal, an intake negative signal, an accelerator state signal, a clutch state signal, a brake state signal, and a neutral state signal. The engine control means 20 can also receive such input signals as needed.

The motor control means 22 includes a motor control unit 40 that is a control circuit, a motor drive unit 42 that is a drive circuit and an input/output-processing section (interface) 44.

Moreover, a cooling sub-radiator 46 connected to the motor 6 is driven under the control of the motor control means 22. In addition, an electric water pump 48 for supplying a cooling water to the electric motor 6 is disposed thereat.

The motor control means 22 is linked at the output side to the motor 6.

The control apparatus 18 of the vehicle-propelling system 2 includes both the engine control means 20 and the motor control means 22. The engine control means 20 controls an operating state of the engine 4, while the motor control means 22 controls both driving and reviving or recharging power-generating states of the motor 6. More specifically, the motor control means 22 does not exchange data with the engine control means 20, is independent from the control of the engine 4 by the engine control means 20 and independently determines and controls the drive state and the recharging power generation state of the motor 6.

Figure 9:
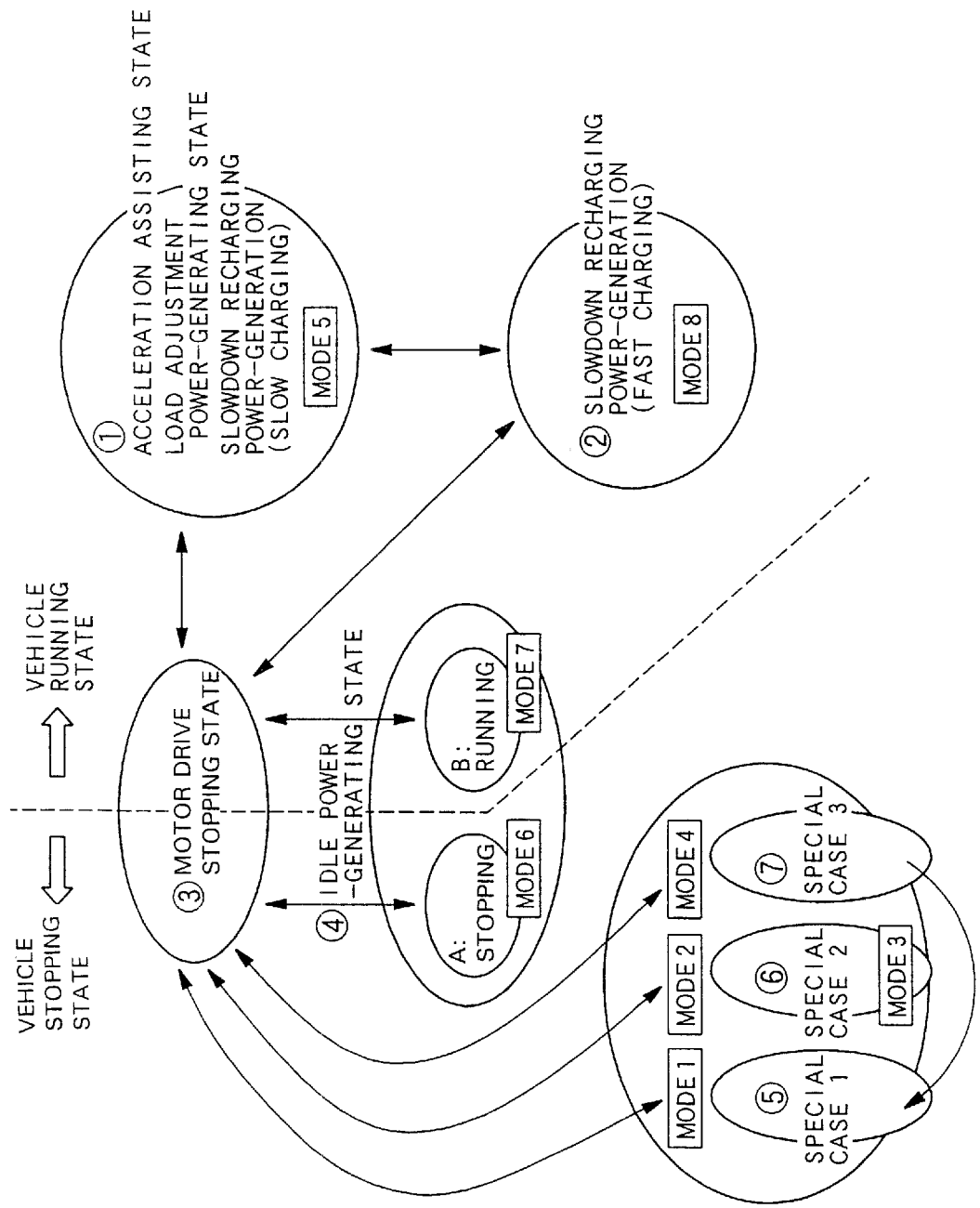
FIG. 9 is a schematic diagram illustrating when switching over occurs in a control mode.

The motor control means 22, as shown in FIG. 9, is set into a stopping control mode, or a traveling control mode, as the control modes are based on a running state of the hybrid vehicle. In addition, the motor control means 22 is at first put into a motor running stop control mode for stopping running of the motor 6, when switching over between the stopping control mode and the traveling control mode.

The motor control means 22 supplies driving electric power to the motor 6, and inputs a main battery voltage signal of a main battery 38 charged by generated electric power from the motor 6. Further, the motor control means 22 governs the main battery mode using the main battery voltage signal.

Moreover, the stopping control mode of the motor control means 22, as shown in FIG. 9, may be set into stop mode (mode 6) in an idling power generation control mode, a start-up drive (so-called start-up assist) control mode (mode 1), a starting drive (so-called starting assist) control mode (waiting: mode 2 and executing: mode 3), and an engine rotational speed-stabilized drive (so-called engine rotational speed-stabilized assist) control mode (mode 4).

When in stop mode (mode 6) in an idling power generation control mode, the motor control means 22 assumes control over the motor 6 so as to permit the motor 6 to generate power and then therewith charge the main battery 38 consisting of a lead storage battery. When in a start-up drive (so-called start-up assist) control mode (mode 1), the motor control means 22 executes control over the motor 6 so as to drive the motor 6 and then assists in starting up the hybrid vehicle. In a starting drive (so-called starting assist) control mode (waiting: mode 2 and executing: mode 3), the motor control means 22 provides control over the motor 6 so as to drive the motor and then assists in starting up the engine 4. In an engine rotational speed-stabilized drive (so-called engine rotational speed-stabilized assist) control mode (mode 4), the motor control means 22 provides control over the motor 6 so as to drive the motor 6 and stabilize engine rotational speed of the engine 4.

Moreover, the traveling control mode (mode 7) of the motor control means 22, as shown in FIG. 9, may be set into a traveling mode (mode 7) in an idling power-generating state, an acceleration assist, a load adjustment voltage and a vehicle slowdown recharging power generation (slow recharging or reviving) control mode (mode 5), and a vehicle slowdown recharging power generation (fast recharging) control mode (mode 8).

In the traveling mode (mode 7) in an idling power-generating control state, the motor control means 22 assumes control over the motor 6 so as to permit the motor to generate power and thus therewith charge the main battery 38. In the acceleration assist, the load adjustment voltage and the vehicle slowdown recharging power generation (slow recharging) control mode (mode 5), the motor control means 22 controls an assist of acceleration, an adjustment of load voltage and a recharging power-generation during vehicle slowdown. In the slowdown recharging power generation (fast recharging) control mode (mode 8), the motor control means 22 controls a recharging or reviving power-generation during vehicle slowdown.

In the motor control means 22, a function to detect an open-circuit voltage of the main battery 38 during a motor driving stop and to set an upper limit-determining voltage and a lower limit-determining voltage for motor driving according to the main battery open-circuit voltage is added.

Therefore, the motor control means 22 has a function to set a motor drive torque revision coefficient and a power-generation torque revision coefficient according to the detected main battery open-circuit voltage.

In addition, the motor control means 22 sets a motor drive torque from a motor drive map therewith and multiplies a set motor drive torque by a motor drive torque revision coefficient. From the calculated value, the motor control means 22 controls driving of the motor 6.

Furthermore, the motor control means 22 determines a calculated voltage value as a driving value when a calculated value is less than the upper limit-determining voltage value.

In addition, the motor control means 22 sets a power-generating torque from a power generating map therewith and multiplies a set power-generating torque by a power-generating torque revision coefficient. From the calculated value, the motor control means 22 generates electricity.

Moreover, the motor control means 22 determines the calculated voltage value as a power-generating value when a calculated voltage value is less than a set voltage value.

First, the following main battery administering control of the motor control means 22 is explained. The main battery administering control is executed for a control mode except those having a start-up assist. The later-mentioned torque order or value limit control of main battery administering control is not executed in an engine rotational-speed stabilization drive (so-called "an engine rotational-speed stabilization assist") control mode (mode 4) that is an idle stabilization assist, at stopping of an idling power-generating control mode (mode 6), and in traveling of idling power-generating control mode (mode 7).

In addition, the main battery administering control only by the main battery voltage detects open-circuit voltage of the main battery 38 at a motor driving stop, and sets the upper limit-determining voltage for motor driving according to the main battery open-circuit voltage. The main battery administering control also sets the lower limit-determining voltage in motor driving, besides executing a torque value limit coefficient (drive/power-generation).

The main battery administering control executes battery administration by the following operations or procedures.

(1) Main battery open-circuit voltage during motor driving stop is detected.
(2) Upper limit-determining voltage in motor driving from a determined value is set.
(3) Lower limit-determining voltage in motor driving from a determined value is set.
(4) Torque value limit coefficient from a determined value is set.
(5) Motor driving start.
(6) Motor driving stop.

Hence, in the procedure (1), main battery open-circuit voltage at motor driving stop, for example, is detected as 197V (a controlling determined value).

Figures 6, 7, 8:
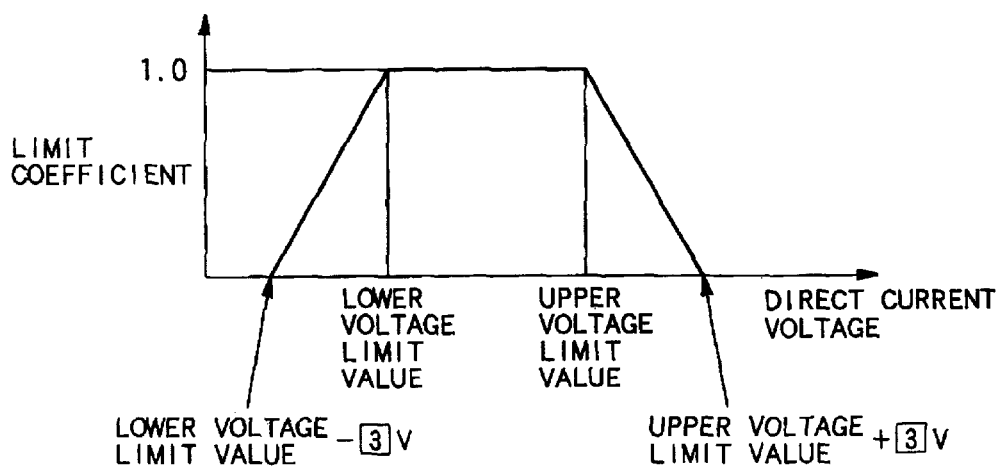
FIG. 6 is a table of upper limit voltage values.
FIG. 7 is a table of lower limit voltage values.
FIG. 8 is a schematic diagram showing a revision state of both upper and lower limit coefficients.

In the procedure (2), an upper limit-determining voltage for motor driving is set as a determined value, for example, 210V. The upper limit-determining voltage as shown FIG. 6, is performed as a search value of a table of upper limit-determining voltage values.

In the procedure (3), a lower limit-determining voltage for motor driving is set as a determined value, for example, 180V. The lower limit-determining voltage as shown FIG. 7, is performed as a search value from a table of lower limit-determining voltage values.

Figures 3, 4, 5:
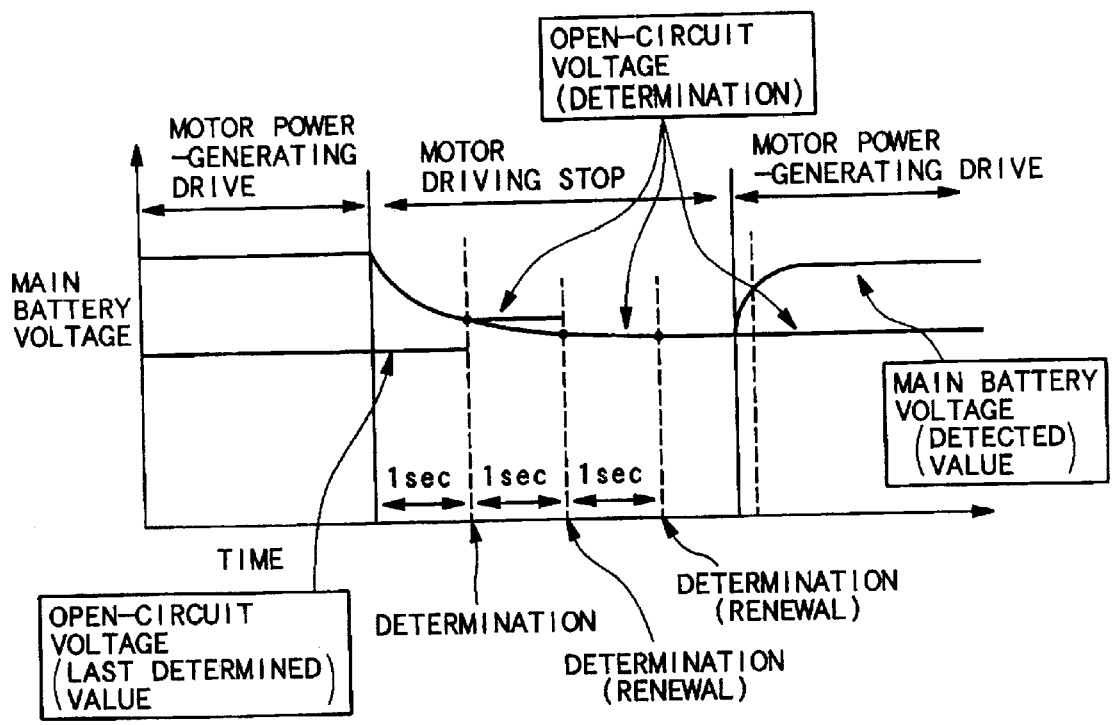
FIG. 3 is a time-chart of a main battery open-circuit voltage determining process.
FIG. 4 is a table of torque value limit coefficients for motor driving.
FIG. 5 is a table of torque value limit coefficients for power-generating driving.

In the procedure (4), a driving torque value limit coefficient is set from a determined voltage value, for example, a driving torque value limit coefficient at driving is set as 0.8 for a 197V. open-circuit voltage to limit an actual torque value at driving. FIG. 4, shows a search value of a table of driving torque value limit coefficients. Then, a torque value limit coefficient at power-generation is set, for example, at 1.5 for a 197V open-circuit voltage. This power-generating torque value limit coefficient at power-generating or recharging, is obtained as a search value from a power-generating torque value limit coefficient table shown in FIG. 5.

The procedure (5) performs motor driving using the torque value limit coefficient and selected motor driving voltage limit values from the above-mentioned procedures (2)–(4).

In addition, the procedure (6) is prepared to return to the procedure (1).

Next, a following detection of main battery open-circuit voltage by the motor control means 22 is explained. The main battery voltage limits control charge and electric discharge of the main battery 38. Voltage as the basis of control is performed using main battery open-circuit voltage in order to prevent inconvenience. However, this main battery open-circuit voltage becomes a transitional state just after motor driving begins. Procedures from the detection of open-circuit voltage to a determination of controlling open-circuit voltage are needed for lowering reply speed of control (namely, "gradual processing") and improving the convergence (namely, "to stabilize").

In detection and determination of a main battery open-circuit voltage, the main battery voltage is detected by sampling and analog to digital conversion, and processing to determine the main battery open-circuit voltage is performed at motor driving stop at which a torque value is 0%.

In determining a main battery open-circuit voltage, if a motor driving stop state has a continued 1000 msec time period (ROM setting value), then the main battery open-circuit voltage is determined or measured.

When this main battery open-circuit voltage is determined, the above-mentioned procedures (2) to (4) (setting limit values) are executed.

After procedures (2) to (4) (setting limit values) have been finished, when a motor driving stopping state continues, as shown in FIG. 3, then a continuation time is counted again, so that an update of main battery open-circuit voltage (a determined value) is repeated at the start of motor driving.

Furthermore, after the above-mentioned main battery open-circuit voltage is determined, the torque value limit coefficients are set from the determined value. The torque value limit coefficients are set for power-generating and driving with the motor.

Next, setting of limit coefficients and a revision policy for torque values are explained.

A torque value limit coefficient is set by the table constituted so as to search by main battery open-circuit voltage (a determined value). Further, the table of torque value limit coefficients for motor driving are shown in FIG. 4. The final motor driving torque value is calculated by the following equation (torque search value in each mode×water temperature revision)×(a driving torque value limit coefficient) ≦100%.

In addition, a table of torque value limit coefficients for power-generation driving is shown in FIG. 5. The final power-generating torque value is set by the following equation (torque search value in each mode+water temperature revision)×(power-generating torque value limit coefficient) ≧–35%.

A revision policy of torque value coefficients, as shown in FIGS. 4 and 5, requires a revision calculation of torque value performed by using each table as follows after a torque value limit coefficient at motor drive/power-generation driving has set.

In motor powered driving, the revision of torque values is performed by the equation:

Final driving torque value=(map search torque value+water temperature revision)×(driving revised torque value limit coefficient).

A calculated final driving torque value satisfies the following equation, and motor driving is executed from the value calculated.

"Final torque value (drive)≦100% (torque value upper limit guard: ROM setting value)"

Incidentally, the above equation means that the maximum of the final torque value is 100% of the motor output (i.e. torque), and that even if the value does not satisfy the above equation as calculated, the calculation value may be ignored.

In power-generation driving, the revision of torque value is performed by the next equation.

Final power-generation torque value=(map search torque value+ water temperature revision)×(revised power-generating torque limit coefficient).

A calculated final torque value satisfies the following equation, and power-generation driving is executed from the calculation value calculated.

"Final Torque value (power-generation)≧−35% (torque value lower limit guard: ROM setting value)".

Incidentally, the above equation means that the minimum of the final torque value is 35% of the motor output (i.e. torque), and that load for the engine is too big when used for more power-generation than this. And mark "−" (a minus) means the power-generation side.

Furthermore, a voltage limit at motor driving is explained. After a main battery open-circuit voltage is determined, both the upper and lower limit-determining voltages at motor driving (at driving/power-generating) are set by a determined value.

Moreover, after a revision calculation of revised torque value limit coefficients, both of the upper and lower limit-determining voltages are executed with the final torque value.

Next, setting of a lower limit-determining voltage and a calculation policy of voltage limit revisions are explained. In setting of both upper and lower limit determining voltages, both of the upper and lower limit determining voltages are set by tables constituted for searching by a main battery open-circuit voltage (a determined value). Here, the table of upper limit-determining voltages is shown in FIG. 6, and the table of lower limit-determining voltages is shown in FIG. 7.

Figure 1:
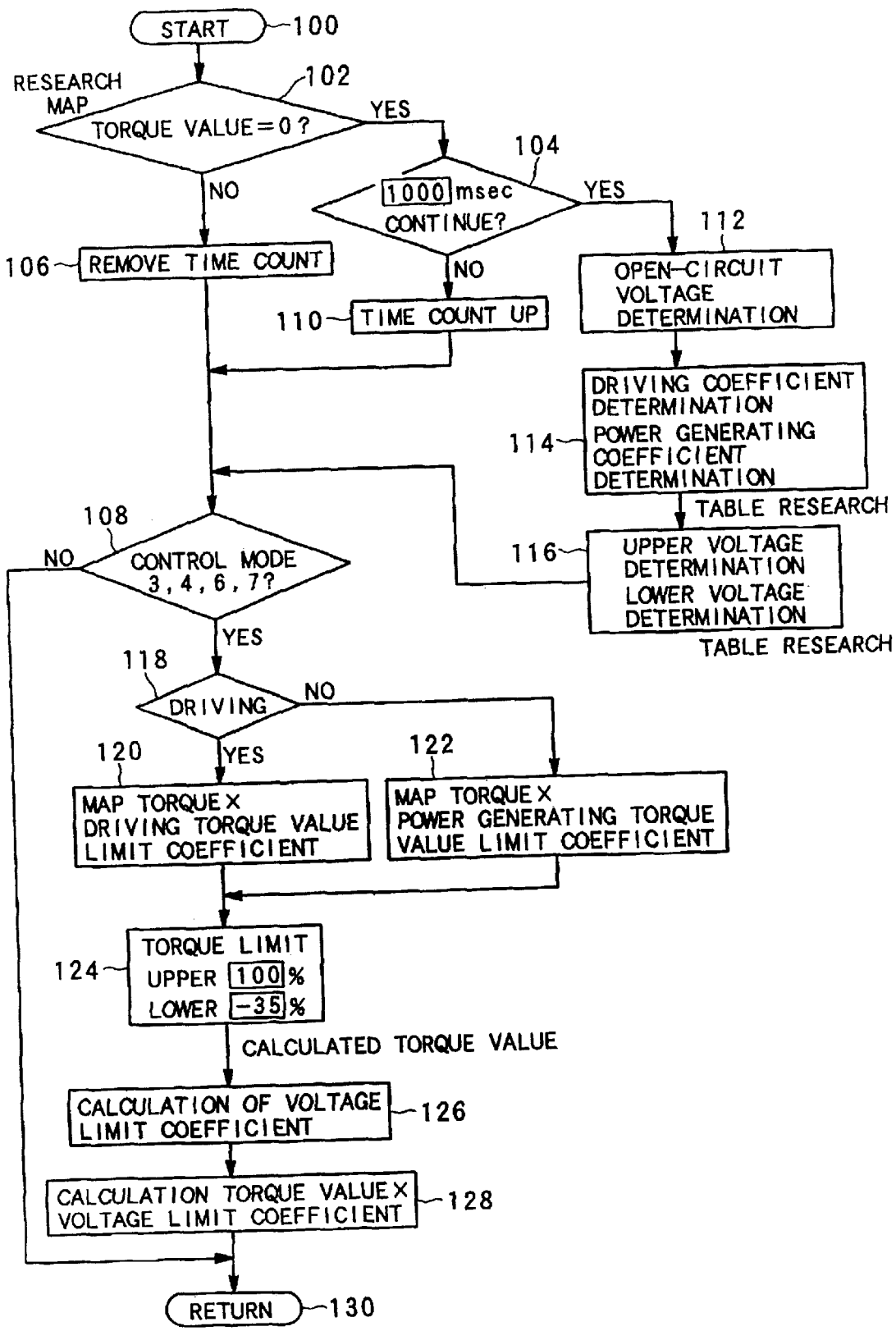
FIG. 1 is a flowchart for a motor main battery administering control according to an embodiment of the present invention.

In addition, the meaning of voltage limit revisions is clear from the flowchart for motor main battery administering control shown in FIG. 1. Motor driving is performed by a calculated torque value, and after motor driving, the voltage is measured and the voltage determining voltages are revised.

And, in the revising policy for voltage limits, both of the upper and lower limit-determining voltage coefficients, as shown in FIG. 8, are set. Revising the torque value is executed by both of the set upper and lower limit-determining voltage coefficients. Hence, the revision of torque value is executed by the following equation:

Final Torque value (a voltage limit)=torque value (power-generation or drive)×(a power-generation or drive) torque value limit coefficient).

Thus torque order decrement control by the common motor control is performed for a final torque value after voltage limit excecution (voltage limit).

Switchover of the control state in a motor assist system is explained. A control state switches over by a driving state of a hybrid vehicle, as shown in FIG. 9.

Control modes of the motor 6 are classified in seven kinds of the following states in FIG. 9. The states are numbered (1–9) within elliptical boxes in FIG. 9.

(1) An acceleration assist, load adjustment voltage, and slowdown recharging power-generation (slow charging): mode 5.
(2) Slowdown recharging power generation (fast charging): mode 8.
(3) Motor driving stop (state waiting until each switchover condition is satisfied).
(4) Idling power-generation (A: at stopping and B: at traveling): modes 6 and 7.
(5) Special case 1 (a starting assist): mode 1.
(6) Special case 2 (a starting-up assist): mode 2 (wait) and mode 3 (execution).
(7) Special case 3 (an engine rotational speed stabilizing assist): mode 4.

Special cases 1–3 are represented by uncircled numbers within elliptical boxes at the bottom of FIG. 9.

Incidentally, while the above control states (1), (2) and (4) are executed, when a switchover condition of special case control (special case: 1–3) has been satisfied, control states of (1), (2) and (4) are removed forcibly, and the routine is switched over to special case control through the motor driving stop of control state (3).

Here, special cases 1 and 2 of special case control do not switch over to the other special control directly.

Furthermore, each special case control (special cases 1–3), after having switched over, does not switch over completely until a removal condition is satisfied. However, in special case 3 of special case control, before a removal condition is satisfied, when a switchover condition of special case 1 has been satisfied, then special case 3 switches over to special case 1.

Operation of the embodiment will now be described with reference to a flowchart for motor main battery administering control of control unit 18 in FIG. 1.

When a controlling program starts control at step 100, then the motor control means 22 determines in step 102 whether expression of torque value=0 is satisfied by a map search.

When the determination in step 102 results in "YES", then a determination is made at step 104 as to whether the state of "YES" continues for 1000 msec. When the determination in step 102 is "NO", then the count for the time period is removed, and a determination is made at step 108 as to whether control mode is from among "3", "4", "6" and "7".

In the determination in previous step 104 as to whether the time period of 1000 msec is continued, when the determination in step 104 results in "NO", then after a time count has been extended at step 110, the routine is shifted to a determination in step 108 which is chosen from among control modes "3", "4", "6" and "7". When the determination in step 104 results in "YES", then a open-circuit voltage is decided at step 112. Therewith, a driving torque limit value coefficient is referenced from a search table, a power-generating torque limit value coefficient is decided at step 114, and by a search table shown in FIGS. 6 and 7, both upper and lower limit-determining voltages are selected at step 116. Then the routine is returned to step 108 to choose among control modes "3", "4", "6" and "7".

When the determination in step 108 results in "NO", then the routine is returned to step 130. When the determination in step 108 results in "YES", then the routine is shifted to a determination at step 118 as to whether there is a driving mode.

When the determination in step 118 results in "YES", then an equation of "map torque×driving torque value limit coefficient" is calculated at step 120. When the determination in step 118 results in "NO", then a expression of "map torque×recharging coefficient" is calculated at step 122. After each calculation, the routine is shifted to step 124 at which a setting of torque limits is performed.

The torque limit may be set at the upper limit of 100% and the lower limit of −35% by a calculated torque value.

Moreover, after setting of the torque limit at step 124, a voltage limit coefficient is calculated at step 126, and a equation of "calculated torque value×voltage limit coefficient" is calculated. Therewith, the routine is returned to previous step 130.

As the motor control means 22 adds functions, the open-circuit voltage of the main battery 38 is detected at motor driving stop, and both upper and lower limit-determining of motor driving are set according to the main battery open-circuit voltage. An over-charge and an over-electric discharge of main battery 38 can be prevented, and it is possible to extend a life of battery. As the motor control means 22 adds functions, the open-circuit voltage of main battery 38 is detected at a motor driving stop, and both upper and lower limit-determining voltages are set according to the main battery open-circuit voltage. Thus over-charge and an over-electric discharge of main battery 38 is prevented, and it is possible to extend battery life. As a result, the control apparatus is advantageous economically, and reliability of the whole system can be improved because the life of the main battery is extended, and the system may have wide use.

In addition, the motor control means 22 adds functions so that a motor drive torque revision coefficient and a power generation torque revision coefficient are set according to the main battery open-circuit voltage detected, so that an over-charge and an over-electric discharge of the main battery 38 can be prevented, and it is possible to extend battery life.

Furthermore, as the motor control means 22 adds functions to set a motor drive torque by a motor drive map, and to control so as to drive the motor by using a calculated value which is obtained by multiplying a set motor drive torque by a motor drive torque revision coefficient, the most suitable drive value can be used for a state of the main battery 38. As a result, a state of use for the main battery 38 improves, and the system can contribute to reduction of fuel consumption.

Additionally, the motor control means 22 adds functions to use a calculated value for a driving limit value when a calculated value is less than the upper limit value, even if a calculated result has shown a wrong value, by establishing a guard for the upper limit value. Thus there is no fear that engine 2 and motor 6 are burdened beyond need. Therefore, the system is advantageous in practical use.

Furthermore, as the motor control means 22 adds functions to set a power-generating torque value with a power-generating map, and controls so as to generate electricity by a calculated value which is obtained by multiplying a set power-generating torque by a power-generating torque revision coefficient, at motor driving, the most suitable quantity of power-generation can be used by a state of main battery 38, and a voltage state of main-battery 38 remains acceptable. As a result, the system can contribute to reduction of fuel consumption.

In addition, as the motor control means 22 adds functions to use a calculated value for power-generation, even if a calculated result has shown a wrong value, by establishing a guard by the set value, there is no fear that engine 2 and motor 6 are burdened beyond need. Therefore, the system is advantageous in practical use.

Incidentally, this invention is not limited to the above-mentioned embodiments, but is suitable to many possible innovations and applications.

For example, in one embodiment of this invention, the main battery uses a lead storage battery, but nickel/hydrogen or lithium ion batteries may be used.

In addition, in cases of detecting the open-circuit voltage of the main battery at motor driving stop, when the main battery voltage is at a nearly fully charged value, then the system can arrange the following special constitution: a charge stored in the main battery may be used for other drive control purposes.

Hence, as in the other driving control, a cooling motor drive occurs. The cooling motor is driven by a stored charge in the main battery, and cooling of a refrigerant is performed.

Thus, the system, by positively using a stored charge in the main battery, can contribute to stabilization of a driving state of a hybrid vehicle. As a result, the system is advantageous in practical use, and can contribute to improved cooling ability.

As amplified in the above-mentioned description, the present invention provides a control apparatus for a hybrid vehicle having an engine and a motor disposed therein as a vehicle-propelling system, the motor being connected to an output shaft and having both driving and power-generating functions. An engine control means controls a running state of the engine; and a motor control means controls both driving and power-generating states of the motor to be independent from the control of the engine by the engine control means. The motor control means functions to detect an open-circuit voltage of a main battery during motor driving stop and to set a upper limit-determining voltage and a lower limit-determining voltage in motor driving according to the main battery open-circuit voltage. As a result, the motor control means is advantageous economically and reliability of the whole system can be improved because the battery life is increased.

The invention claimed is:

1. A control apparatus for a hybrid vehicle having an engine and a motor disposed therein as a vehicle-propelling system, the motor being connected to an output shaft and having both driving and power-generating functions, comprising: an engine control means which controls a running state of the engine; and a motor control means which controls both driving and recharging power-generating states of the motor to be independent from the control of the engine by the engine control means, wherein the motor control means functions to detect an open-circuit voltage of a main battery during a motor driving stop to set a upper limit-determining voltage and a lower limit-determining voltage for motor driving according to the main battery open-circuit voltage.

2. A control apparatus for a hybrid vehicle as defined in claim 1, wherein said motor control means functions to set a motor drive torque revision coefficient and a power-generation torque revision coefficient according to the main battery open-circuit voltage detected.

3. A control apparatus for a hybrid vehicle as defined in claim 2, wherein said motor control means sets a motor drive torque value from a motor drive torque map, multiplies a set motor drive torque value by a motor drive torque revision coefficient, and from a calculated value, controls to drive the motor.

4. A control apparatus for a hybrid vehicle as defined in claim 3, wherein said motor control means determines the calculated value as a driving value when the calculated value is less than the upper limit-determining voltage value.

5. A control apparatus for a hybrid vehicle as defined in claim 2, wherein said motor control means sets a power-generating torque value from a power generating torque map, multiplies a set power-generating torque value by a power-generating torque revision coefficient, and from a calculated value, controls to generate electricity.

6. A control apparatus for a hybrid vehicle as defined in claim 5, wherein said motor control means determines the calculated value as a power-generating value when the calculated value is less than the set torque value.

* * * * *